FIG. 4

INVENTOR.
Robert R. Kaufmann
BY
Ooms, McDougall and Hersh
Att'ys

FIG. 6

United States Patent Office 3,230,985
Patented Jan. 25, 1966

3,230,985
COIL SPRING LOOPING MECHANISM
Robert R. Kaufmann, 2717 W. 83rd St., Chicago 52, Ill.
Filed Dec. 3, 1962, Ser. No. 241,903
17 Claims. (Cl. 140—103)

This invention relates to an apparatus for the manufacture of coil springs. In particular, the apparatus is designed for the production of coil springs in desired lengths having loops formed at either end.

There are a wide variety of applications for coil springs having looped ends whereby the springs can be attached to various members. For example, in the manufacture of typewriters, calculators and the like, a great number of small coiled springs must be utilized and these springs are provided with looped ends whereby they can be attached to various posts, arms, et cetera, within the mechanism.

In the manufacture of springs of relatively small diameter and in certain applications where large diameter springs are to be provided, it is necessary to form the springs within certain critical dimensional ranges. Thus, the coil lengths which are provided must be within certain tolerances in order to provide the desired amount of force for a particular application. In the mass production of coil springs, certain problems have arisen in an attempt to provide lengths of uniform size. It has been found that in order to provide the desired uniformity, it was necessary to employ extremely expensive manufacturing techniques or similarly expensive methods for inspecting production runs.

Certain other problems have been recognized in the manufacture of springs by mass production techniques. Thus, the formation of the spring lengths in a rapid fashion has presented many difficulties including high reject rates due to distortion of the springs by cutting and loop forming mechanisms.

It is an object of this invention to provide an improved apparatus which enables the efficient production of coil spring lengths having looped ends.

It is a more particular object of this invention to provide a coil spring manufacturing apparatus which overcomes the difficulties of the prior art in that spring lengths having looped ends can be produced at a high production rate within close dimensional tolerances and without any significant reject rate.

These and other objects of this invention will appear hereinafter and for purposes of illustration but not of limitation, specific embodiments of this invention are shown in the accompanying drawings in which.

The apparatus of this invention generally comprises an improvement in mechanisms previously devised for the forming of coil spring lengths. Thus, various prior art mechanisms are available which provide for the feeding of an elongated wire into the vicinity of a means for forming the wire into coils. When these forming means receive the wire, it is directed in the form of a continuous coil whereby it can be subjected to further working operations.

In accordance with this invention, a first loop forming means is provided for engaging the leading end of the coil and for forming a loop in this coil. A coil cutting means is situated adjacent the first looping means and the leading end of the coil is fed through this cutting means for a distance sufficient to provide the desired coil length. The cutting means is then made operative and the severed length of coil is engaged by a gripping mechanism. This mechanism is adapted to position the coil adjacent second loop forming means whereby the opposite end of the coil length can be provided with a loop.

GENERAL OPERATION

Figures 7, 8, 9:
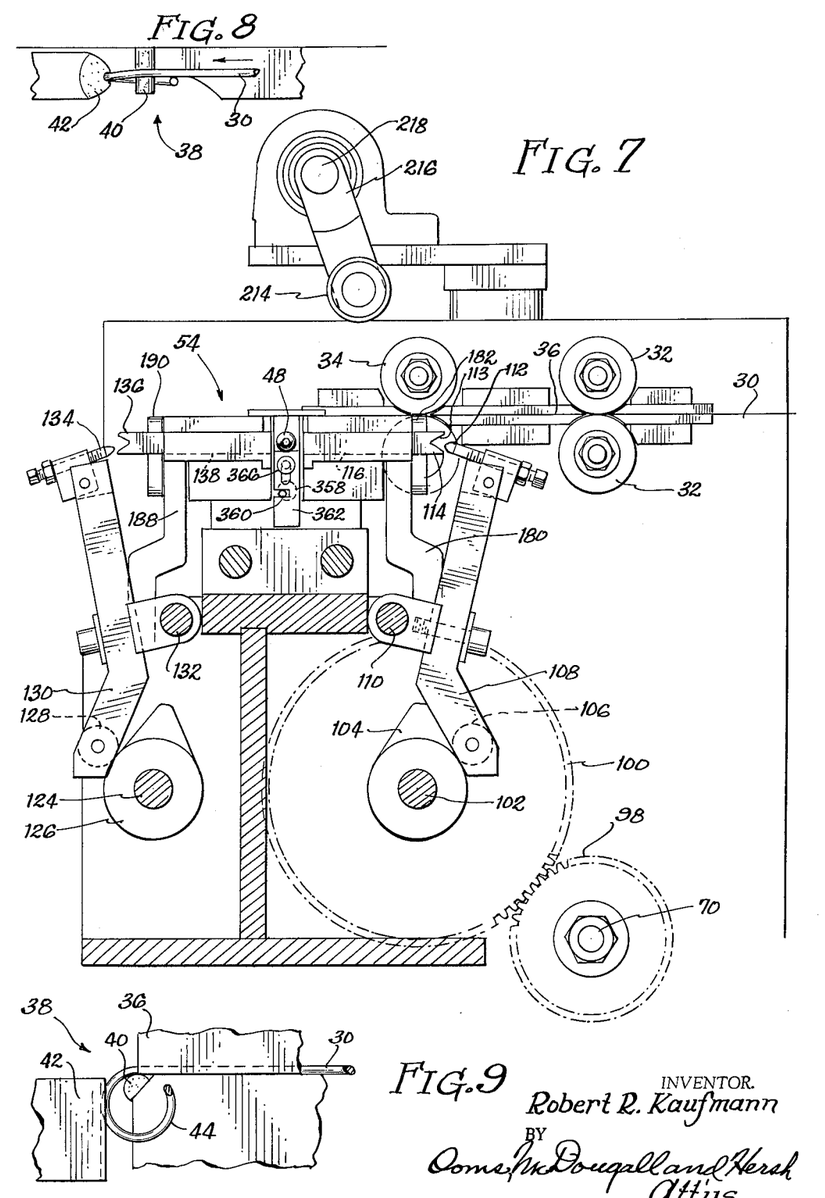
FIGURE 7 is a vertical section taken about the line 7—7 of FIGURE 4.
FIGURE 8 is a detail view of the wire coiling means utilized in the apparatus.
FIGURE 9 is an additional detail view of the wire forming means.

In the operation of the illustrated apparatus, a wire 30 is fed from a source (not shown). The wire is advanced by means of feed rollers 32 and 34. A wire guide way 36 aids in confining the wire in the desired path and this guide way leads the wire to a coil forming means generally designated by the numeral 38. As best shown in FIGURES 8 and 9, this forming means comprises a pin 40 and a forming nose 42. The wire is advanced over the pin and beyond to engage the nose 42 whereby it will form a continuous coil 44 comprising closely spaced helices.

The coil 44 is directed through a bore 46 and to coil guide way 48 which is located in the block 50. The leading end of the coil is adapted to be stopped adjacent a first looping means generally designated by the numeral 54 (see FIGURE 1). A loop is adapted to be formed in the leading end of the coil at this time and the coil is then fed to a cutter designated by the numeral 56. It will be appreciated that as each length of coil is cut, a new leading end will be presented by the coil 44 and the looping means 54 will operate on this new leading end during each cycle of the apparatus.

As the severing of the coil 44 into a coil length 58 takes place, the length is grasped by a pair of gripping jaws 60 and 62. These jaws are adapted to move the coil adjacent a second looping means generally designated by the numeral 64. A loop is then formed in the opposite end of the coil length and the length is then released and dropped on to chute 66 and then into collecting pan 68.

Wire advancing drive mechanism

In the wire feeding operation, it is necessary to provide for intermittent movement of the wire so as to permit cutting and loop forming while the wire is held stationary. This intermittent movement is effected by means of the drive mechanism for wire feed rollers 32 and 34. This mechanism, best shown in FIGURES 5 and 6, utilizes the main drive shaft 70 of the apparatus. The shaft 70 is provided with a gear 71 which in turn drives the gear 72. The gear 72 includes a crank pin 74 in its face which operatively engages the sector gear 76. This sector gear is pivotally connected at 78 to the vertical member 80 which forms part of the frame of the apparatus. Oscillating movement is imparted to the sector gear upon rotation of the gear 72.

A pinion 82 is adapted to engage the sector gear and this pinion is operatively connected through one way clutch 84 to shaft 86. Rotation of this shaft provides for driving of the gear 94, shaft 96 and the feed rollers 32 and 34 through a gear train (not shown). It will be appreciated that by reason of the inclusion of the one way clutch 84, the pinion 82, and, accordingly, the rollers 32 and 34, will rotate in only one direction in response to movement of the sector gear 76. During the return movement of the sector gear, the feed rollers will be stationary and the cutting and looping operations are carried out at this time.

A friction applying member 88 is connected to the shaft 96 in order to prevent override of the wire feeding rollers 32 and 34. An adjusting means 90 is associated with this friction means so that the feed rollers will rapidly discontinue movement when the sector wheel completes the roller advancing portion of its cycle.

Coil looping mechanism

The operating means for the leading end looping means 54 is best illustrated in FIGURE 7. The mechanism is driven by means of a gear 98 tied to the main drive shaft 70. This gear serves to rotate gear 100 tied to the shaft 102 which in turn results in the rotation of cam 104. Cam engaging roller 106 provides for pivoting of lever 108 about the connection 110. At the upper end of the lever 108, there is provided an adjustable engaging pin 112 which is adapted to engage the V shaped opening 113 defined in the slide 114. This slide is received in a channel 116 and is normally held in the retracted position shown by means of internal springs.

Figures 1, 2, 3:
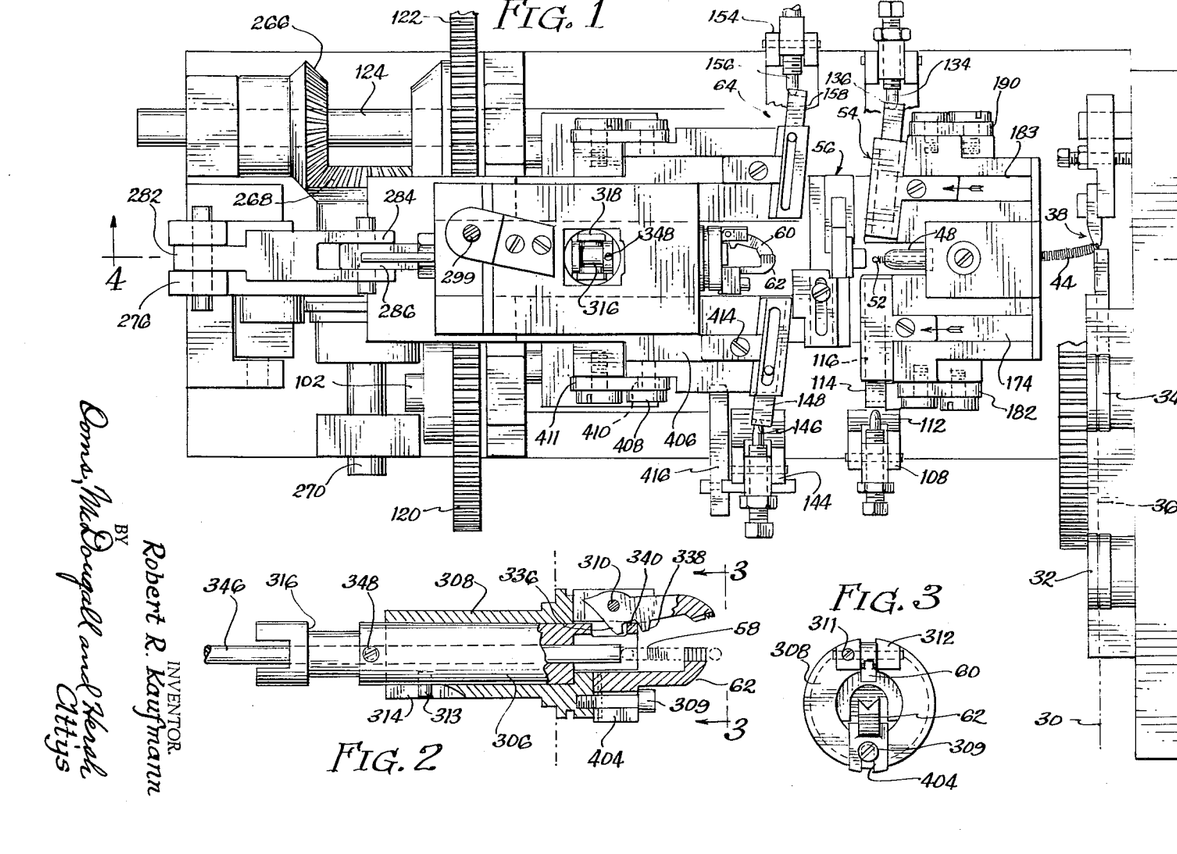
FIGURE 1 is a plan view of the spring forming, cutting, and looping sections of the apparatus.
FIGURE 2 is an enlarged fragmentary view of coil length gripping jaws utilized in the apparatus.
FIGURE 3 is an end view taken about the line 3—3 of FIGURE 2.
Figure 5:
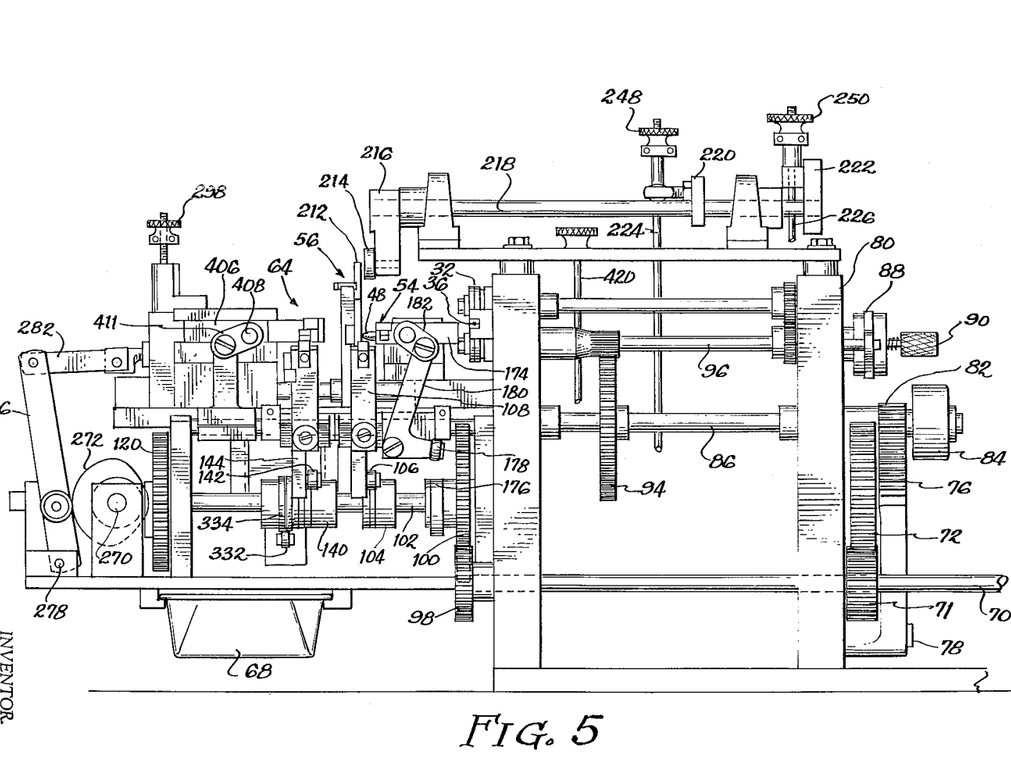
FIGURE 5 is a front elevation of the apparatus including an illustration of the drive section as well as the coil forming, cutting and looping sections.
Figure 6:
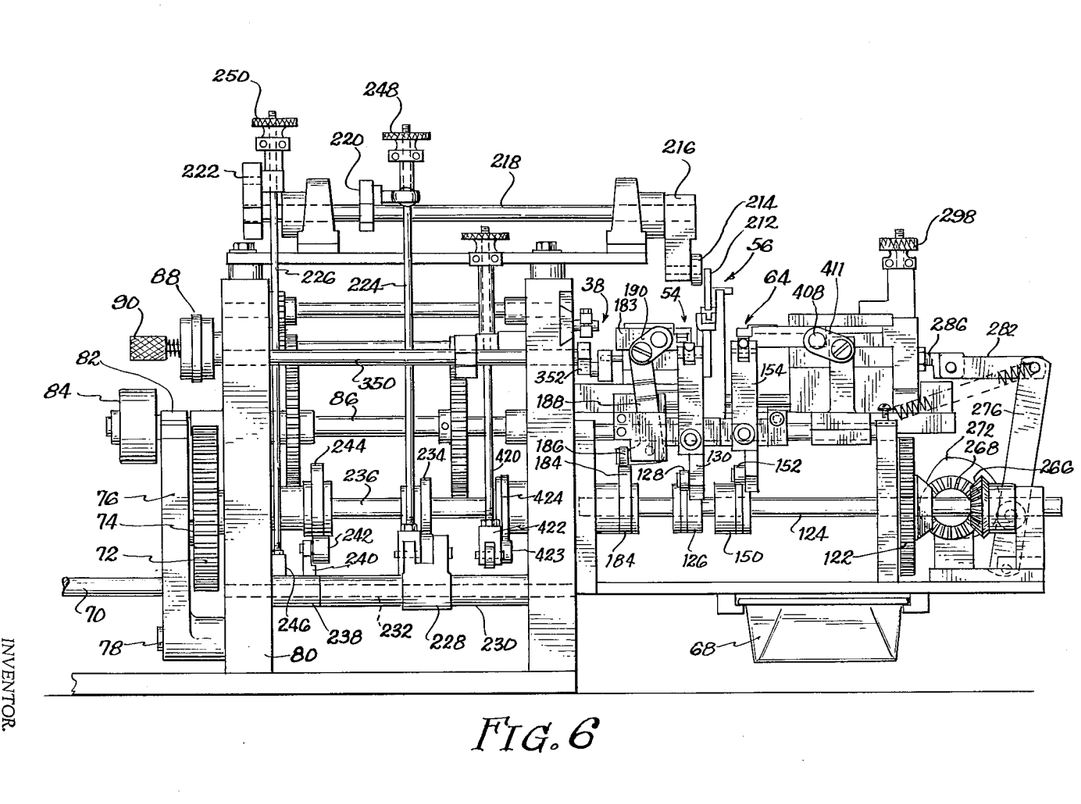
FIGURE 6 is a rear elevation including the sections shown in FIGURE 5.

A gear 120 is also tied to the shaft 102 and this gear serves to drive gear 122 tied to the shaft 124 on the opposite side of the apparatus. A cam 126 is tied to this shaft and roller 128 connected to the lever 130 engages the cam 126 to provide for pivoting of the lever about the connection 132. Engaging pin 134 serves to move slide 136 which is located in a channel 138 directly opposite the slide 114. The looping means 64 which is provided for looping the opposite end of a coil length is provided with a similar operating structure. This structure, which is best shown in FIGURES 1, 5 and 6, includes a first cam 140 tied to the shaft 102. A cam engaging roller 142 serves to pivot lever 144 whereby the pin 146 will operatively engage the slide 148. A corresponding structure is located on the opposite side of the apparatus including cam 150 which is tied to the shaft 124 and which engages roller 152 for pivoting of lever 154 and for moving the pin 156 into contact with slide 158.

FIGURES 17 through 25 illustrate the specific means utilized in the looping operations. As shown, the coil 44 is directed through coil guide way 48 to a position adjacent the slides 114 and 136 which form a part of looping means 54. The slide 136 is provided with a cutout portion 160 while the slide 114 is formed with a finger 162.

Figures 17, 18, 20, 21, 22, 23, 24, 25:
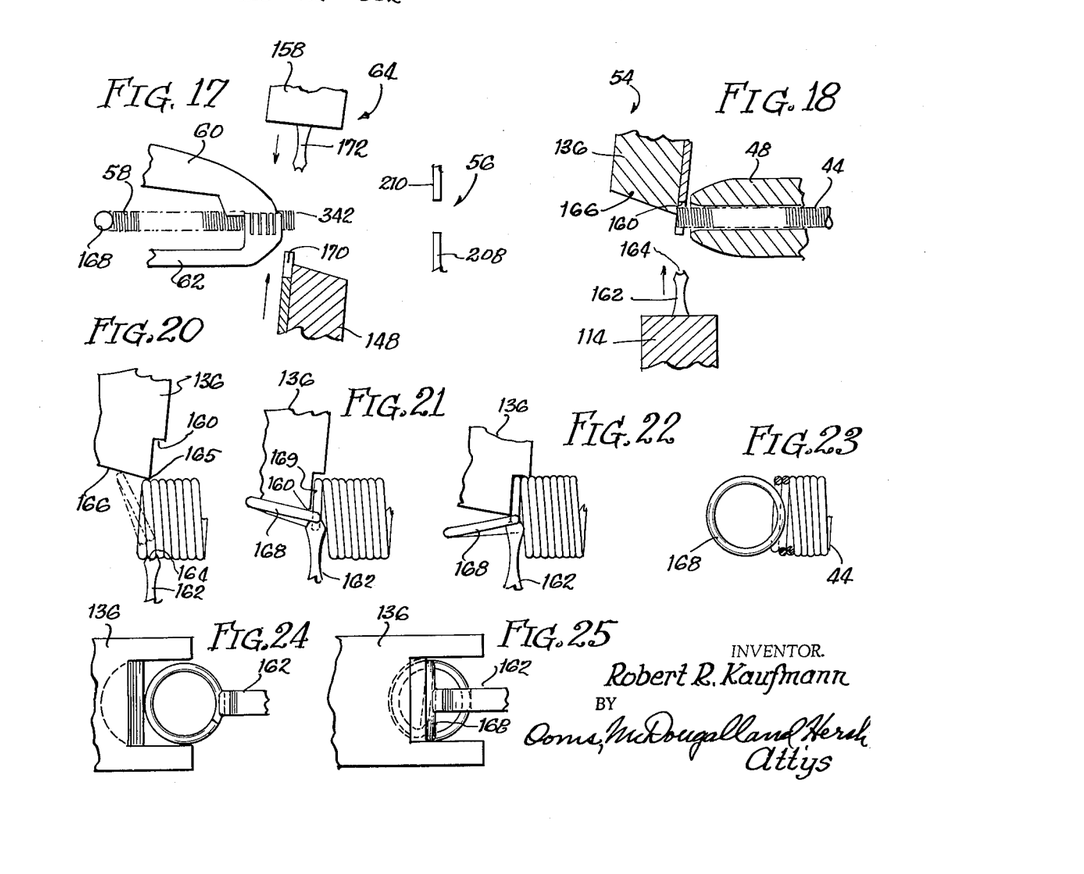
Figure 19:
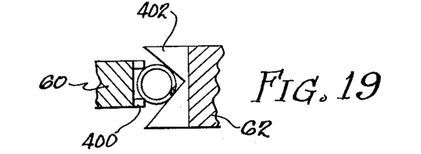

The finger 162 is provided with a concave end 164 which has a radius approximately equal to that of the wire forming the coil, and, therefore, the end 164 is adapted to receive the leading coil as shown in FIGURE 20. This leading coil also engages the outermost edge 165 of the slide 136 and the coil is adapted to bend and move down the sloping surface 166 of this slide as the two slides come closer together. Finally, the end coil will be bent as shown in FIGURES 21 and 22 whereby a loop 168 approximately at right angles to the other portions of the coil will be formed. The portion 169 of the coil adjacent the loop 168 is received in the cutout portion 160 to prevent the possibility of displacement of the coil during the loop forming operation.

As shown in FIGURE 17, the severed coil length 58 having a previously formed loop 168 is adapted to be grasped by the jaws 60 and 62. The slides 148 and 158 which form part of the looping means 64 are provided with cutout 170 and finger 172 respectively. The looping operation at the opposite end of the coil length can thus be carried out in a manner substantially the same as described with respect to the leading end.

It will be appreciated that the rises on the cams tied to shafts 102 and 124 will result in periodic movement of the slides which effect the looping operations. These looping operations can thus be synchronized with the feeding of the wire and formation of the coil whereby a smooth cycle of operation can be accomplished.

It will be appreciated that the leading end of the coil will be within the cutter after completion of the severing operation. The cutter is adapted to be moved away in a manner to be explained and the looping means 54 is adapted to be moved axially of the coil a short distance to properly position the looping mechanism. This movement is effected in large slides 174 and 183 which carry the looping slides 114 and 136.

The movement of the slide 174 is effected through engagement of cam 176, which is tied to shaft 102, with roller 178. This results in pivoting of lever 180 which is connected to the slide 174 by means of link 182. The large slide 183 is moved through operation of cam 184 which is tied to the shaft 124. The cam 184 engages roller 186 thereby pivoting lever 188 which is connected to slide 183 by means of link 190. These larger slides are preferably provided with springs (not shown) which hold the slides in their normal retracted positions.

Coil cutting mechanism

The cutter means 56 includes a lower stationary blade 208 and an upper movable blade 210. The blade 210 is rigidly fixed on a slide 212 which is adapted to be engaged by roller 214 mounted on rocker arm 216. The arm 216 is adapted to be moved through operation of rocker shaft 218.

As best shown in FIGURES 5 and 6, the shaft 218 is provided with lever means 220 and 222 which have rods 224 and 226, respectively, secured to them. The rod 224 is fixed to one arm of bifurcated member 228 which is tied to sleeve 230, this sleeve being in turn rotatably mounted about rod 232.

The member 228 is adapted to oscillate due to engagement with cam 234 fixed on shaft 236. The shaft 236 is continuously driven by the main drive of the apparatus through gear 72 which is tied to this shaft. It will be apparent that oscillation of the member 228 will impart reciprocal movement to the rod 224 which in turn will impart rocking movement to the shaft 218. When the slide 212 is positioned for a cutting operation, the roller 214 will engage this slide and impart reciprocal movement thereof.

A sleeve 238 is also provided around the rod 232. An arm 240 formed integrally with this sleeve supports a roller 242 which is adapted to engage cam 244. The rod 226 is fixed to the sleeve 238 by means of arm 246 and the interengagement of the cam and roller will impart reciprocal movement to the rod 226. Since this rod is also tied to the shaft 218, its action will cooperate to move the movable cutter blade 210. It has been found that the combination of a pair of rods of the type illustrated provides for a smoother cutting operation and permits a fine adjustment in this operation as will hereinafter appear. The knobs 248 and 250 at the ends of the rods are particularly useful in making such adjustments.

The specific structure of the cutter blades 208 and 210 has not been illustrated, however, a suitable structure may be found in applicant's copending application Serial No. 233,595, filed October 29, 1962. The cutter mechanism described therein is particularly suitable for use in combination with the apparatus of this invention since the cutter structure provides an extremely reliable means for achieving a high production rate with a minimum of rejects.

Figure 4:
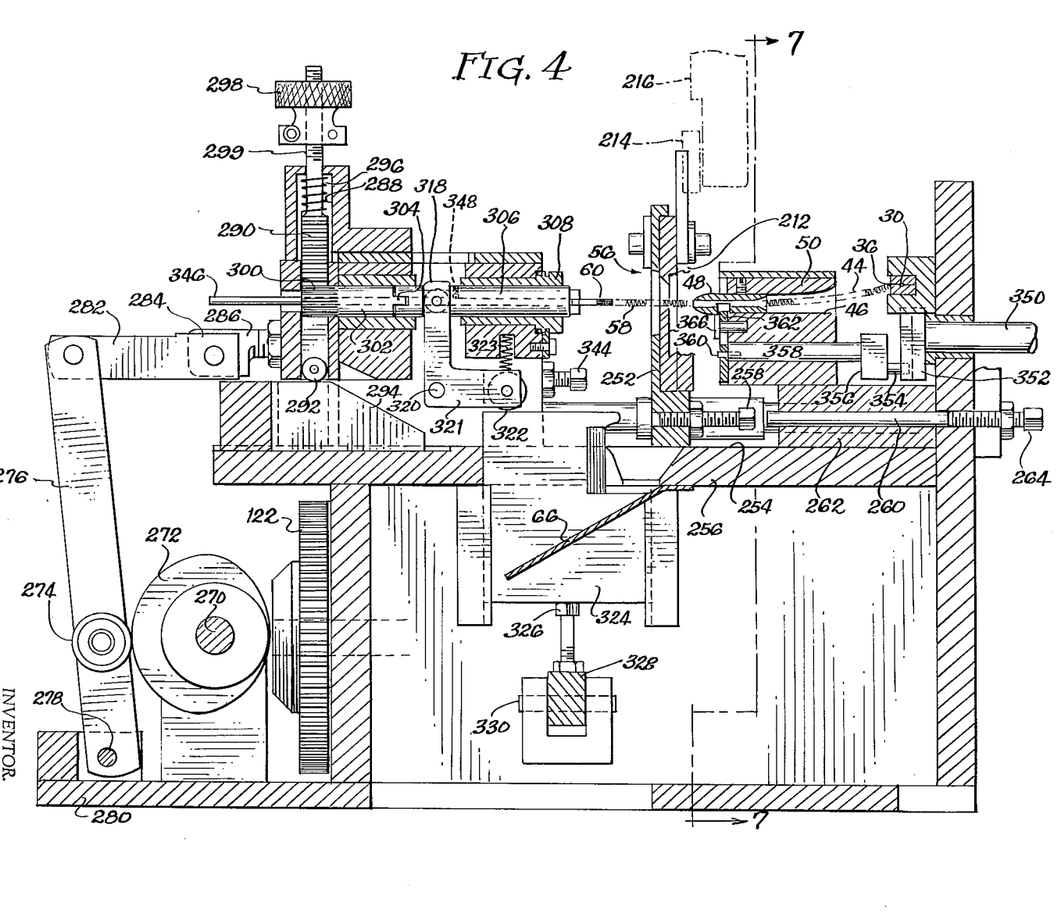
FIGURE 4 is a vertical section of the apparatus taken about the line 4—4 of FIGURE 1.

As previously noted, the cutter 56 must move away to permit engagement of the looping mechanisms for the leading end 52 of the coil 44. Movement of the cutter can be accomplished since the cutter is fixed on a mounting 252 which is slideably received in a horizontal channel 254 defined by the frame member 256 (see FIGURE 4). Forward movement of the slides 174 and 183 causes these slides to move against the cutter mounting and will position the cutter as shown in FIGURE 4. Upon return movement of the cutter, the bolt head 258 will engage a rod 260 which is located in block 262. An adjusting bolt 264 contacts this rod whereby the cutter can be accurately positioned upon its return movement.

*Coil length gripping mechanism*

Upon completion of the cutting operation, the jaws 60 and 62 are adapted to be moved into position to grasp a coil length 58. These jaws are then adapted to be retracted whereby the looping mechanism 64 can operate to form a loop in the opposite end of the coil length.

The means for moving the jaws 60 and 62 are driven through shaft 124. Bevel gear 266 connected to this shaft engages bevel gear 268 tied to the shaft 270. Cam 272 is also tied to this shaft and this cam engages roller 274 mounted on lever 276. This lever is pivoted about the point 278 which is a stationary point integral with the bottom wall 280 of the apparatus. A link 282 is connected at the upper end of the lever and this link defines a bifurcated end 284 which is connected to extension 286 fixed to a slide assembly for the gripping jaws.

The assembly includes a vertical channel 288 which carries a rack 290. A roller 292 is fixed at the lower end of the rack and this roller is adapted to ride on the downwardly sloping surface 294 as the assembly moves from left to right (see FIGURE 4). A spring 296 as well as the weight of the rack will tend to urge the rack downwardly during this movement. The knob 298 is threaded on to the extension 299 of the rack and this knob provides a means for limiting the vertical fall of the rack assembly.

A pinion 300 is operatively engaged with the rack 290 and this pinion is integrally formed at one end of a sleeve member 302. This sleeve member is tied to an adjacent sleeve 306 which extends to the vicinity of the jaws 60 and 62. An outer sleeve 308 is provided for holding the jaws. The lower jaw 62 is secured to the sleeve 308 by means of a bolt 309. The upper jaw 60 is received on a pin 310 secured by means of screw 311 in a bifurcated extension 312 formed in the sleeve 308. The sleeves 302 and 306 are adapted to rotate along with the pinion 300. A pin 313, which is received in a slot 314 defined by the outer sleeve 308, provides for rotation of this outer sleeve along with the sleeve 306.

The sleeve 306 includes a reduced portion 316 which receives a vertically extending bifurcated arm 318 (see FIGURE 4). This arm is pivoted at 320 and is provided with an integrally formed arm 321 which serves as a mounting for roller 322. The roller 322 is normally urged downwardly by a spring 323 and is adapted to be engaged by a sliding plate 324 whereby it will pivot in opposition to the spring 323.

The movement of the plate 324 is effected by means of a bolt 326 fixed at one end of lever 328. This lever pivots about the point 330 and is provided with a roller 332 at its opposite end (see FIGURE 5). The roller 332 is adapted to engage cam 334 which is tied to the shaft 102. When the high point on the cam 334 engages the roller, the plate 324 will be moved upwardly whereby the sleeve 306 will be shifted from right to left. The pin 312 will move in the slot 314 and relative shifting of the sleeves 306 and 308 can thus be accomplished.

The movable jaw 60 is provided with depending portions 336 and 338 which receive a finger 340 formed in the sleeve 306. It will be appreciated that movement of the sleeve 306 from right to left will result in closing of the jaws around a coil length 58. The rise on the cam 334 is located whereby this closing movement will take place after the jaws have been moved adjacent the cutter by reason of the operation of the cam 272. Furthermore, the jaws are adapted to remain closed until the looping means 64 operate to engage the coil length 58. Accordingly, when the looping means retract, the coil length will drop into the collecting pan 68.

As indicated, the sleeves 302, 306 and 308 will rotate during movement of the jaw assembly. This rotary movement is effected in order to provide for the formation of a proper loop in the coil length 58. Specifically, the rotary movement is provided in order to position the severed end in the coil length whereby a loop of the desired extent will be formed. Referring to FIGURE 17, which is a plan view, it will be noted that the severed end 342 is located at the side of the coil length 58. By positioning the severed end in this manner, a full loop can be formed in the coil. However, to reach this position of the severed end, it is necessary to rotate the coil length 58 since the severed end is offset 90° from this position at the bottom of the coil after the cutting operation. By setting the rack knob 298 to effect a 90° rotation, during movement from the cutter to the position shown in FIGURE 4, then the desired full loop can be obtained. It will also be appreciated that by adjusting the knob 298, loops of varying extent can be obtained without difficulty.

In accordance with the operating sequence of this invention, the jaws 60 and 62 are positioned to receive a new coil length 58 just prior to the beginning of the cutting operation. With this arrangement, the cutter 56 can be repositioned prior to cutting through operation of the cam 272 which slides the assembly toward the cutter assembly. Specifically, a bolt head 344 is mounted for movement with the jaw assembly ends adapted to engage the mounting means 252 of the cutter. This will move the cutter positioning bolt 258 into engagement with the rod 260 and the assembly will thus be rigidly held as the cutting operation commences.

It will be noted with particular reference to FIGURES 2 and 4 that a rod 346 is received within the bores of sleeves 302 and 306. A set screw 348 rigidly positions this rod within the bores and this rod provides the means for insuring uniform length in the spring lengths 58. Thus, it has been explained that the cam 272 effects positioning of the jaw assembly prior to initiation of the cutting operation. After positioning of the jaw assembly and with the cutter in the open position, the feed mechanism is operated whereby the coil 44 is fed through the cutter and in between the jaws 60 and 62. The loop 168 which has been formed in the leading end of the coil 44 will engage the end of the rod 346. This will effect jamming of the coil to the extent that a substantially solid cylinder is formed in the coil. Since a virtually solid body is provided each time a coil length is to be severed, and since the spacing of the cutter and the end of the rod 346 is constant, spring lengths of uniform dimensions are produced. It will be noted in this connection that the forming means 38 is disposed out of line with respect to the rod 346 whereby buckling will occur in the coil 44 if the feed rollers feed a slightly excessive amount of wire.

The off center positioning of the forming means 38 is also important with respect to the action of the cutter. Specifically, the displacement of the coil by the cutter does not tend to jam (and possibly distort) the coil 44 since buckling is permitted.

Means are also provided for clamping the coil 44 within the guide way 48 after the feed means has fed the coil whereby the loop 168 engages the rod 346. The operating structure for the clamp means comprises a shaft 350 which is connected to a disc 352 which in turn is provided with a pin 354. This pin is mounted off center with respect to member 356 whereby rotary movement can be imparted to rod 358 which is received in the block 50. An off center pin 360 is provided in the end of the rod 358 and rotation of this rod imparts reciprocal movement to plate 362 which receives the pin 360. The end of the plate 362 is adapted to move into a recess 364 defined in the guide way 48 and the plate end is adapted to fit around the coil 44 to clamp this coil within the guide way. A stud 366 confines the plate with respect to the block 50.

Movement of the shaft 350 is effected through reciprocal movement of the rod 420 (see FIGURE 6). This rod is connected to pivotally mounted arm 422 which is pivoted to impart reciprocal movement to the rod 420 through engagement of its associated roller 423 with the cam 424. This cam is mounted on shaft 236 along with the cams 244 and 234.

The plate 362 operates to clamp the coil after the cutter blade is in position between adjacent coils and just prior to the coil severing stroke of the cutter. The plate 362 then holds the coil until looping means 54 engage the leading end 52. When the looping means are holding this leading end, the plate 362 is released so as not to interfere with the looping operation.

It will be noted that the gripping jaws 60 and 62 define slots 400 and 402 respectively. These slots are dimensioned whereby adjacent coils will be held in adjacent slots although not entirely received therein. Accordingly, when the jaws 60 and 62 first grip a coil length, they will hold adjacent coils in constant relative positions until released. Since the severed end formed by the cutter and the rotation of the jaws are constant, the loop forming mechanisms will always engage the end of a coil length at the same position, and, therefore, the loop configuration for which the apparatus is set will be constant.

A further feature regarding the gripping jaws concerns the capability of adjusting the lower jaw 62 for coils of different diameter. This is made possible by the provision of a slot 404 defined in the lower jaw whereby this jaw can assume various positions when fixed in place by means of the bolt 309.

Cycle of operation

Figure 10:
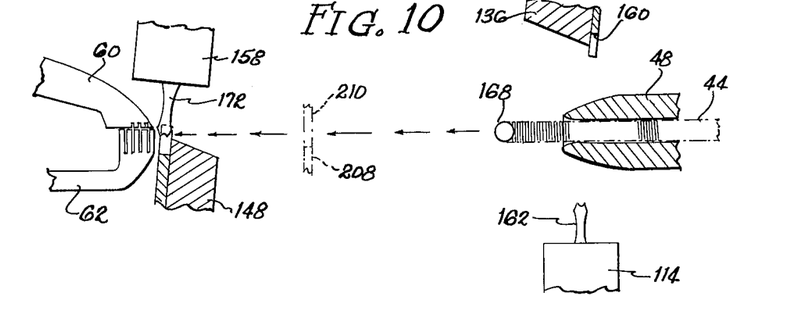
FIGURES 10 through 25 comprise sequential views illustrating details of the coil cutting and looping operations.
Figure 11:
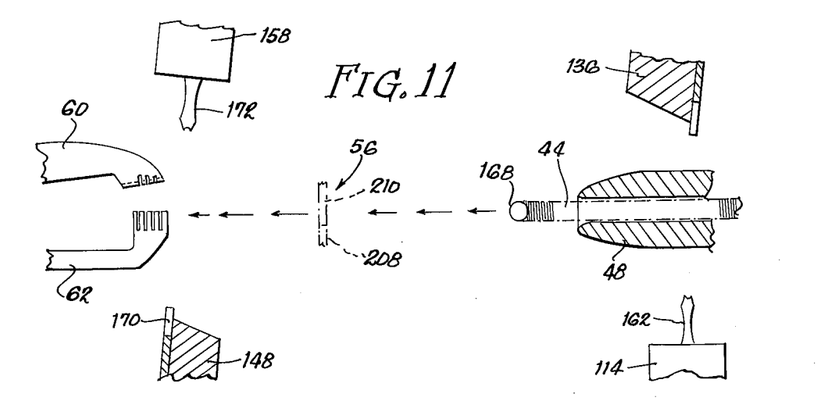
Figure 12:
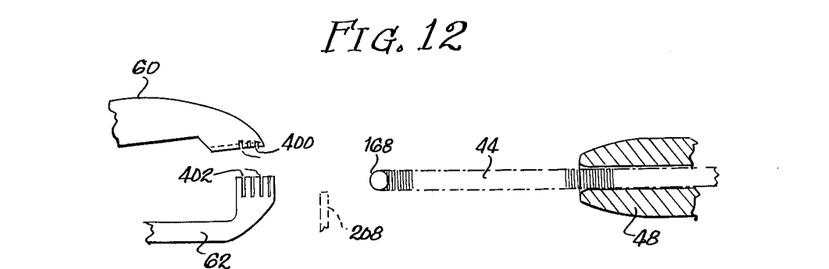
Figure 13:
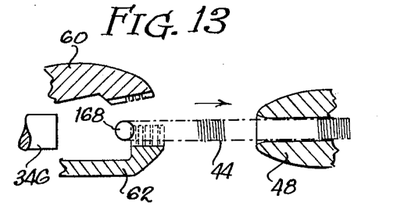
Figure 14:
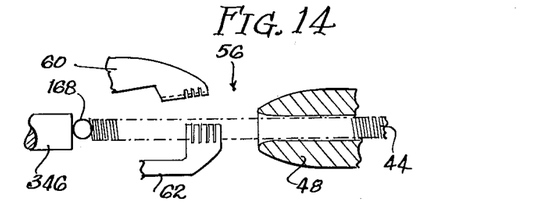
Figure 15:
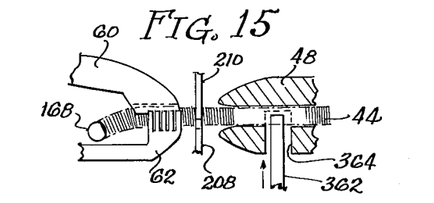

The operating cycle of the apparatus is best described with reference to FIGURES 10 through 18. In FIGURE 10, the elements are shown as they appear immediately after completion of the forming of a loop in the trailing end of coil length 58 and immediately after formation of a loop 168 in the leading end of the coil 44. The coil looping means and the jaws are parted and the coil 44 is advanced through the cutter. The jaws 60 and 62 are also advanced as shown in FIGURE 12 to a position closer to the cutter whereby they can receive the coil 44. When the coil end strikes the rod 346, the travel of the coil is stopped and the jaws 60 and 62 are then closed through operation of the shifting sleeve 306. As shown in FIGURE 15, clamping by means of the plate 362 is effected and the cutting operation takes place.

Figure 16:
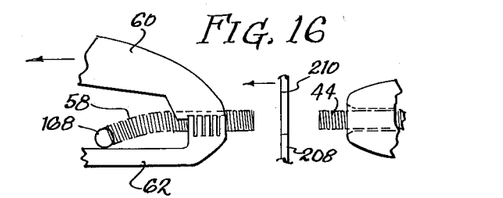

FIGURE 16 illustrates the jaws 60 and 62 holding the coil length 58 moving away from the cutter blades. The slides for looping means 54 move in at this time whereby the cutter is also moved to free the leading end for formation of the loop 168. The looping means 64 also operates at this time to effect formation of a loop in the opposite end of the previous coil length 58.

The apparatus of this invention is preferably designed to provide various extremely fine movements which render its operation superior to known mechanisms designed for a similar purpose. Specifically, with regard to the loop forming operation, means are provided for moving the slide members 136 and 148 a distance axially of the coil which is approximately equal to the wire thickness in the coil. This movement in the members 136 and 148 is made relative to the fingers 162 and 172, respectively, and it has been found that an extremely ideal leverage condition arises due to this movement whereby the loops formed can be easily produced in any desired alignment relative to their associated spring lengths.

The movement in the member 136 is brought about by providing a slight rise in the cam 184 which serves to move the slide 183. As best illustrated in FIGURES 20 and 21, the fingers 162 and the slide 136 originally progress along a path which will cause these members to engage each other. By providing a rise in the cam 184 sufficient to move the slide 183 a single coil thickness, or some fraction thereof, the opening 160 of the slide 136 will be moved over whereby the end of the finger 162 will be aligned with this opening. As the finger movement progresses, the loop 168 bends beyond the axial plane through the coil 44, and when the spring-back occurs, the loop 168 will assume a perpendicular relationship with respect to the coil.

Axial movement of the slide 148 is effected through movement of the slide 406 which defines a channel for sliding movement of the slide 148. The slide 406 has a pin 408 connected thereto and this pin is adapted to move within an oversize hole 410 defined in the link 411. A vertically extending pin 414 is also connected to the slide 406 and this pin extends into the path of actuating member 416. This actuating member is tied for movement along with the lever 144, and by providing a slight rise in the cam 140 which moves this lever, the member 416 will engage the pin 414 to effect axial movement of the slide 148.

As previously noted, the jaws 60 and 62 are rotatably mounted to effect the proper configuration in the loop at the coil end 342. The instant invention also provides means for varying the loop configuration in the leading end 52. Specifically, the cutter mechanism can be rotated within its mounting whereby the blades thereof will sever the coil at different points along its periphery.

In this connection, a modification in the rotating means for the jaws 60 and 62 is also contemplated. Specifically, it is proposed that the sloping surface 294 be employed for effecting only a portion of the possible 360° movement of the coil. Thus, an upwardly sloping surface can be used in place of the surface 294 whereby the jaws will rotate in the opposite direction to effect the necessary movement. There will never be a need for rotation of greater than 180° when this alternative is employed.

The apparatus of this invention is believed to be an extremely important contribution for the reason that the wire forming and looping operations are combined in an extremely efficient manner. By employing the operating structures described, coils with looped ends can be produced at substantially the same production rate as coils heretofore have been produced without looped ends. The combination of these operations provides a further advantage in that load testing of the coil lengths can be carried out immediately to thereby permit minor adjustments in the apparatus in the earliest stages of a production run. The use of a segment arm drive for forming of the wire into a coil in combination with a looping means is also an extremely important feature since this drive mechanism represents a highly efficient means for use in a system of this nature.

It will be obvious that the described apparatus can be run in an extremely efficient manner which can be controlled to effect a high rate of production with a minimum of possible error. A single main drive is provided for the apparatus and this drive controls feeding of the wire as well as the coiling operation, and provides for the cutting operation and each of the looping operations. All of the mechanisms operated by this drive are provided with adjusting means whereby the various operations can be synchronized in the described manner with a minimum of delay between the operating steps. Furthermore, by reason of the adjustability of each of the components described, the apparatus can be utilized for the formation of coil lengths of a wide variety of sizes. The mechanism of this invention, as previously noted, permits the formation of springs of varying lengths and having varying loop configurations. These versatile characteristics as well as other factors included in the described apparatus have produced an extremely reliable and efficient system for the production of looped springs.

It will be understood that various changes and modifications can be made in the described apparatus which provide the characteristics of this invention without departing from the spirit thereof particularly as defined in the following claims.

That which is claimed is:

1. In a spring forming apparatus of the type including means for feeding an elongated wire into said apparatus and means for receiving said wire and forming it into coils, the improvement comprising means for driving said formed coils along a line through said apparatus, means for intermittently stopping said drive means, a first looping means for engaging the leading end of said coil and for forming a loop in said end, a coil cutting means situated adjacent said first looping means, said cutting means being adapted to sever said coil at a point spaced from said leading end to thereby provide the desired length for said springs, said first looping means being adapted to engage said cutting means to move said cutting means away from cutting position whereby said first looping means is adapted to form a loop in the leading end of the coil, means for gripping a severed spring length located on the side of said cutting means opposite said first looping means, and a second looping means situated on the same side of said cutting means for forming a loop in the end of said spring length opposite said leading end.

2. An apparatus in accordance with claim 1 wherein said cutting means is reciprocally mounted in said apparatus for movement axially of the coil movement, means for moving said cutting means away from its cutting position after a cutting operation, and wherein said first looping means is reciprocally mounted for movement axially of the coil movement, means for moving said first looping means into position for forming a loop after said cutting operation, and means for operating said second looping means upon movement of said cutting means away from the cutting position.

3. An apparatus in accordance with claim 1 wherein said gripping means is positioned on a reciprocal mounting, a stop member rigidly associated with said mounting, said wire feeding and coil forming means operating to move a formed coil through said cutting means whereby said coil abuts said stop means, and means for clamping said coil after it abuts said stop means whereby the length of a severed coil can be accurately controlled.

4. An apparatus in accordance with claim 1 wherein said formed coils are delivered through a guide means, an opening defined by said guide means, plate means adapted to extend to said opening and to move into clamping engagement with said formed coils for holding the coils during the cutting operation.

5. An apparatus in accordance with claim 4 wherein cam shafts are provided for sequentially moving said cutting means, said looping means and said plate means into coil engaging positions, said plate means being adapted to engage said coil after the cutter blade has contacted the coil and prior to the severing stroke of said blade, and said plate means being adapted to hold the coil until said first looping means engage said coil, said plate means being released prior to formation of the loop by said first looping means so as not to interfere with this looping operation.

6. In a spring forming apparatus of the type including means for feeding an elongated wire into said apparatus and means for receiving said wire and forming the wire into a continuous coil, the improvement comprising a main drive means for said apparatus, a first looping means comprising a pair of slide members, a pair of cam shafts driven by said drive means, cam means tied to said shaft and operatively connected to said slide members whereby loop forming elements on said slide members are adapted to engage the leading end of said coil for forming a loop in said end, a coil cutting means situated adjacent said first looping means, said cutting means including at least one movable blade, an additional cam shaft driven by said drive means and operatively connected to said movable blade, said cutting means being adapted to sever said coil at a point spaced from said leading end to thereby provide the desired length for said springs, means for gripping a severed spring length located on the side of said cutting means opposite said first looping means, a further cam shaft driven by said drive means and cam means tied thereto for reciprocally moving said gripping means, second looping means situated on the same side of said cutting means and comprising a pair of sliding members, additional cam means tied to said pair of cam shafts operatively connected to said last mentioned slide members whereby loop forming elements on said slide members are adapted to form a loop in the end of a spring length opposite said leading end, said cutting means being reciprocally mounted in said apparatus, means for moving said cutting means away from its cutting position subsequent to a cutting operation, and wherein said first looping means is reciprocally movable, cam means tied to said pair of cam shafts for moving said first looping means into position for forming a loop after said cutting operation.

7. An apparatus in accordance with claim 6 wherein said cutting means is moved away from its cutting position in response to engagement with said first looping means as it moves into position.

8. In a spring forming apparatus of the type including means for feeding an elongated wire into said apparatus and means for receiving said wire and forming the wire into a continuous coil, the improvement comprising a main drive means for said apparatus, a first looping means comprising a pair of slide members, a pair of cam shafts driven by said drive means, cam means tied to said shaft and operatively connected to said slide members whereby loop forming elements on said slide members are adapted to engage the leading end of said coil for forming a loop in said end, a coil cutting means situated adjacent said first looping means, said cutting means including at least one movable blade, an additional cam shaft driven by said drive means and operatively connected to said movable blade, said cutting means being adapted to sever said coil at a point spaced from said leading end to thereby provide the desired length for said springs, means for gripping a severed spring length located on the side of said cutting means opposite said first looping means, a further cam shaft driven by said drive means and cam means tied thereto for reciprocally moving said gripping means, second looping means situated on the same side of said cutting means and comprising a pair of sliding members, additional cam means tied to said pair of cam shafts operatively connected to said last mentioned slide members whereby loop forming elements on said slide members are adapted to form a loop in the end of a spring length opposite said leading end, said gripping means being positioned on a reciprocal mounting operatively connected to the cam means on said further cam shaft, said last mentioned cam means operating to move said mounting after a cutting operation to dispose said opposite end of a spring length adjacent said second looping means, means for releasing said gripping means as said second looping operation commences, and wherein said last mentioned cam means also operates to reverse said mounting to force said mounting into engagement with said cutting means and to thereby reposition said cutting means for a subsequent looping operation.

9. An apparatus in accordance with claim 8 wherein said gripping means comprise a pair of jaws, means associated with said reciprocal mounting for rotating said jaws as said gripping means position said coil length adjacent said second looping means, and means for adjusting the amount of said rotation in said jaws whereby the extent of the loop formed by said looping means can be controlled.

10. An apparatus in accordance with claim 9 including an additional cam operated by said main drive shaft, and means associated with said mounting and operating in response to said last mentioned cam for opening and closing the jaws of said gripping means.

11. In a spring forming apparatus of the type including means for feeding an elongated wire into said apparatus and means for receiving said wire and forming it into coils, the improvement comprising a first looping means for engaging the leading end of said coil and for forming a loop in said end, a coil cutting means situated adjacent first looping means, said cutting means being adapted to sever said coil at a point spaced from said leading end to thereby provide the desired length for said springs, means for altering the position of said cutting means to thereby alter the position of the severed end of said coil and to thereby determine the configuration of the loop formed in said leading end, gripping jaws for gripping a severed spring length, said jaws being located on the side of said cutting means opposite said first looping means, means for moving the jaws carrying the severed spring away from said cutting means, means for rotating said jaws during said movement, a second looping means for forming a loop in the end of said spring length opposite said leading end, and means for varying the degree of rotation of said gripping jaws to thereby determine the configuration of the loop in said opposite end.

12. In a spring forming apparatus of the type including means for feeding an elongated wire into said apparatus and means for receiving said wire and forming the wire into a coil, the improvement comprising a first looping means for engaging the leading end of said coil and for forming a loop in said end, a coil cutting means situated adjacent said first looping means, said cutting means being adapted to sever said coil at a point spaced from said leading end to thereby provide the desired length for said springs, means for gripping a severed spring length, and second looping means for forming a loop in the end of a spring length opposite said leading end, said cutting means being reciprocally mounted in said apparatus for movement axially of the coil movement, means for moving said cutting means away from its cutting position after a cutting operation, and means for operating said second looping means upon movement of said cutting means away from the cutting position.

13. In a spring forming apparatus of the type including means for feeding an elongated wire into said apparatus and means for receiving said wire and forming the wire into a coil, the improvement comprising a first looping means for engaging the leading end of said coil and for forming a loop in said end, a coil cutting means situated adjacent said first looping means, said cutting means being adapted to sever said coil at a point spaced from said leading end to thereby provide the desired length for said springs, clamp means for holding said coil during severing by the cutting means and until said first looping means engages said leading end, means for releasing said clamp means after said severing and prior to formation of said loop in said leading end, additional means for gripping a severed spring length, and second looping means for forming a loop in the end of a spring length opposite said leading end, said gripping means being reciprocally mounted in said apparatus for movement axially of the coil movement, means for moving said gripping means after a cutting operation to dispose said opposite end of a spring length adjacent said second looping means, and means for releasing said gripping means as said second looping operation commences.

14. In a spring forming apparatus of the type including means for feeding an elongated wire into said apparatus and means for receiving said wire and forming it into coils, the improvement comprising a first looping means for engaging the leading end of said coil and for forming a loop in said end, a coil cutting means situated adjacent said first looping means, said cutting means being adapted to sever said coil at a point spaced from said leading end to thereby provide the desired length for said springs, means for gripping a severed spring length located on the side of said cutting means opposite said first looping means, and a second looping means situated on the same side of said cutting means for forming a loop in the end of said spring length opposite said leading end, said cutting means being moved away from its cutting position in response to engagement with said first looping means as it moves into position, and wherein said gripping means is positioned on a reciprocal mounting in said apparatus, means for moving said mounting after a cutting operation to dispose said opposite end of a spring length adjacent said second looping means, means for releasing said gripping means as said second looping operation commences, and means for reversing movement of said mounting to force said mounting into engagement with said cutting means and to thereby reposition said cutting means for a subsequent looping operation.

15. In a spring forming apparatus of the type including means for feeding an elongated wire into said apparatus and means for receiving said wire and forming the wire into a continuous coil, the improvement comprising a main drive means for said apparatus, a first looping means comprising a pair of slide members, a pair of cam shafts driven by said drive means, cam means tied to said shaft and operatively connected to said slide members whereby loop forming elements on said slide members are adapted to engage the leading end of said coil for forming a loop in said end, a coil cutting means situated adjacent said first looping means, said cutting means including at least one movable blade, an additional cam shaft driven by said drive means and operatively connected to said movable blade, said cutting means being adapted to sever said coil at a point spaced from said leading end to thereby provide the desired length for said springs, means for gripping a severed spring length located on the side of said cutting means opposite said first looping means, a further cam shaft driven by said drive means and cam means tied thereto for reciprocally moving said gripping means, second looping means situated on the same side of said cutting means and comprising a pair of sliding members, additional cam means tied to said pair of cam shafts operatively connected to said last mentioned slide members whereby loop forming elements on said slide members are adapted to form a loop in the end of a spring length opposite said leading end, and including means for moving one of the slide members in each of said looping means axially of said coil to provide additional leverage during formation of said loops.

16. In a spring forming apparatus of the type including means for feeding an elongated wire into said apparatus and means for receiving said wire and forming the wire into a continuous coil, the improvement comprising a main drive means for said apparatus, a first looping means comprising a pair of slide members, a pair of cam shafts driven by said drive means, cam means tied to said shaft and operatively connected to said slide members whereby loop forming elements on said slide members are adapted to engage the leading end of said coil for forming a loop in said end, a coil cutting means situated adjacent said first looping means, said cutting means including at least one movable blade, an additional cam shaft driven by said drive means and operatively connected to said movable blade, said cutting means being adapted to sever said coil at a point spaced from said leading end to thereby provide the desired length for said springs, means for gripping a severed spring length located on the side of said cutting means opposite said first looping means, a further cam shaft driven by said drive means and cam means tied thereto for reciprocally moving said gripping means, second looping means situated on the same side of said cutting means and comprising a pair of sliding members, additional cam means tied to said pair of cam shafts operatively connected to said last mentioned slide members whereby loop forming elements on said slide members are adapted to form a loop in the end of a spring length opposite said leading end, and wherein a pair of cams are situated on said additional cam shaft which is operatively connected to said movable blade, one of said last mentioned cams being adapted to move said movable blade into position closely adjacent said stationary blade without serving the wire of a coil, and the other of said cams being adapted to complete movement of said movable blade to sever said wire.

17. In a spring forming apparatus of the type including means for feeding an elongated wire into said apparatus and means for receiving said wire and forming the wire into a continuous coil, the improvement comprising a main drive means for said apparatus, a first looping means comprising a pair of slide members, a pair of cam shafts driven by said drive means, cam means tied to said shaft and operatively connected to said slide members whereby loop forming elements on said slide members are adapted to engage the leading end of said coil for forming a loop in said end, a coil cutting means situated adjacent said first looping means, said cutting means including at least one movable blade, an additional cam shaft driven by said drive means and operatively connected to said movable blade, said cutting means being adapted to sever said coil at a point spaced from said leading end to thereby provide the desired length for said springs, means for gripping a severed spring length located on the side of said cutting means opposite said first looping means, a further cam shaft driven by said drive means and cam means tied thereto for reciprocally moving said gripping means, second looping means situated on the same side of said cutting means and comprising a pair of sliding members, additional cam means tied to said pair of cam shafts operatively connected to said last mentioned slide members whereby loop forming elements on said slide members are adapted to form a loop in the end of a spring length opposite said leading end, and wherein said gripping means comprise upper and lower jaws, slots formed laterally of said jaws dimensioned in a manner such that sliding movement of coils gripped by said jaws is prevented.

References Cited by the Examiner
UNITED STATES PATENTS

| | | | |
|---|---|---|---|
| Re. 22,567 | 11/1944 | Hicks | 140—103 |
| 940,828 | 11/1909 | Sleeper | 140—103 |
| 1,065,336 | 6/1913 | Bigelo | 140—103 |

CHARLES W. LANHAM, *Primary Examiner.*